United States Patent Office

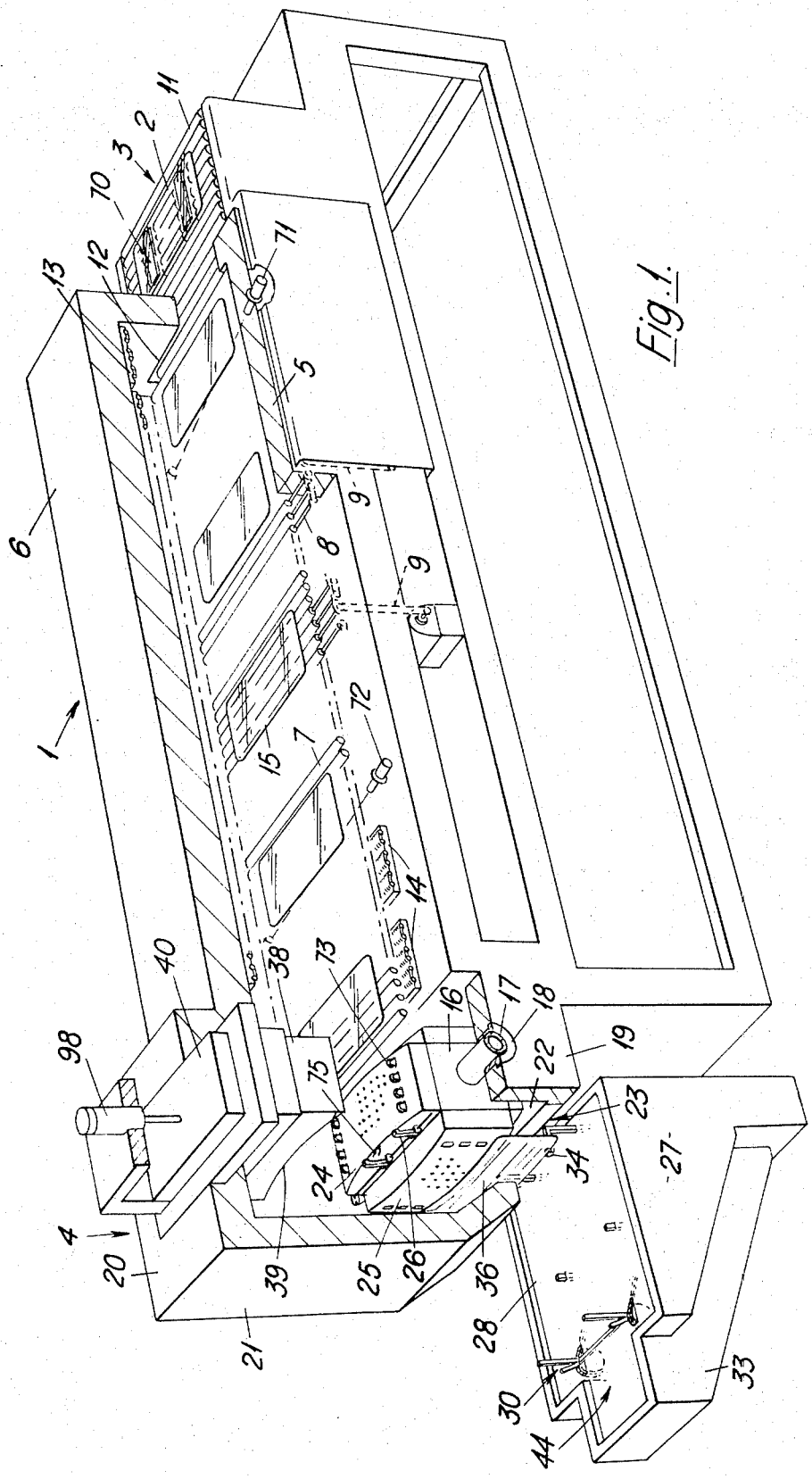

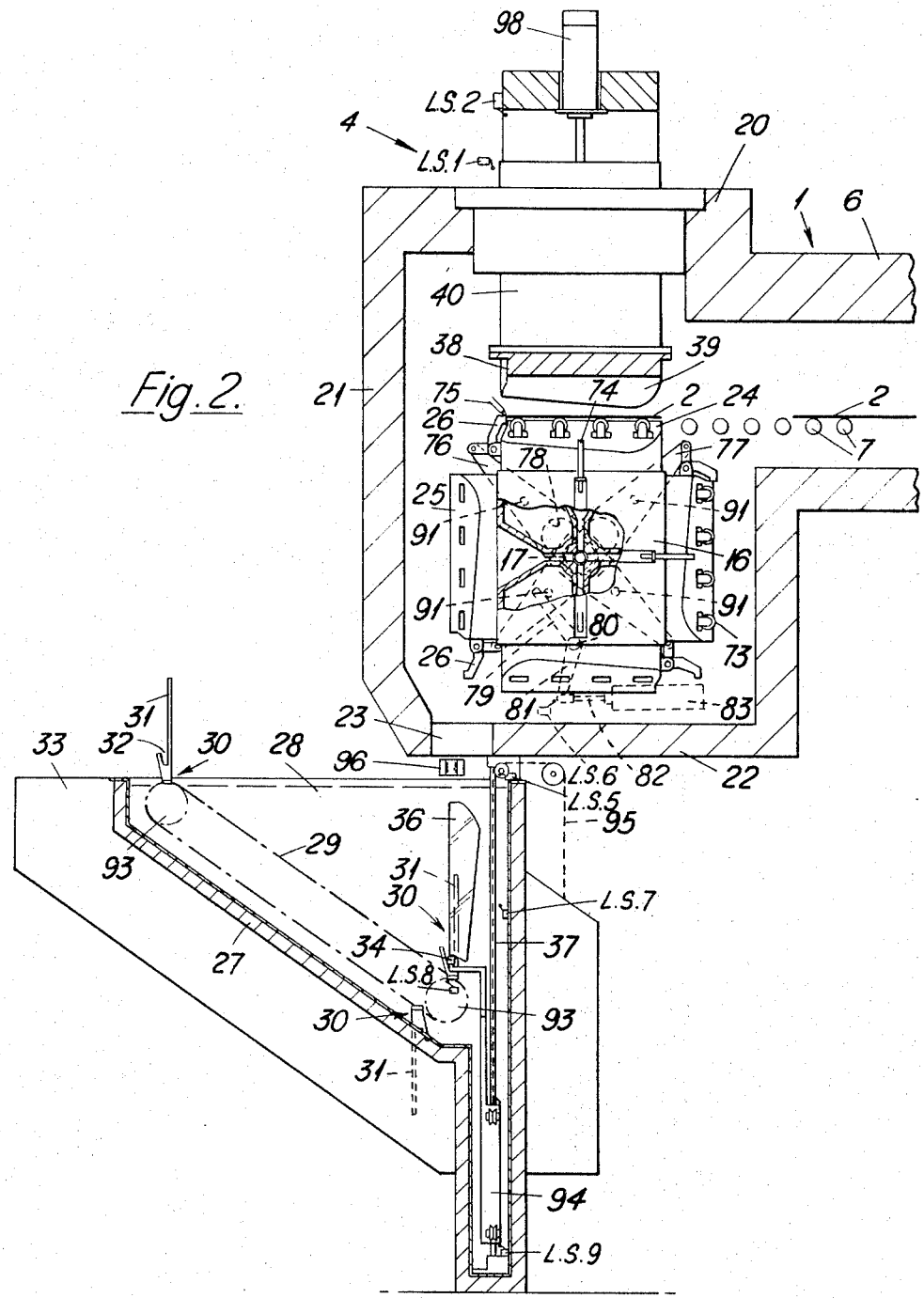

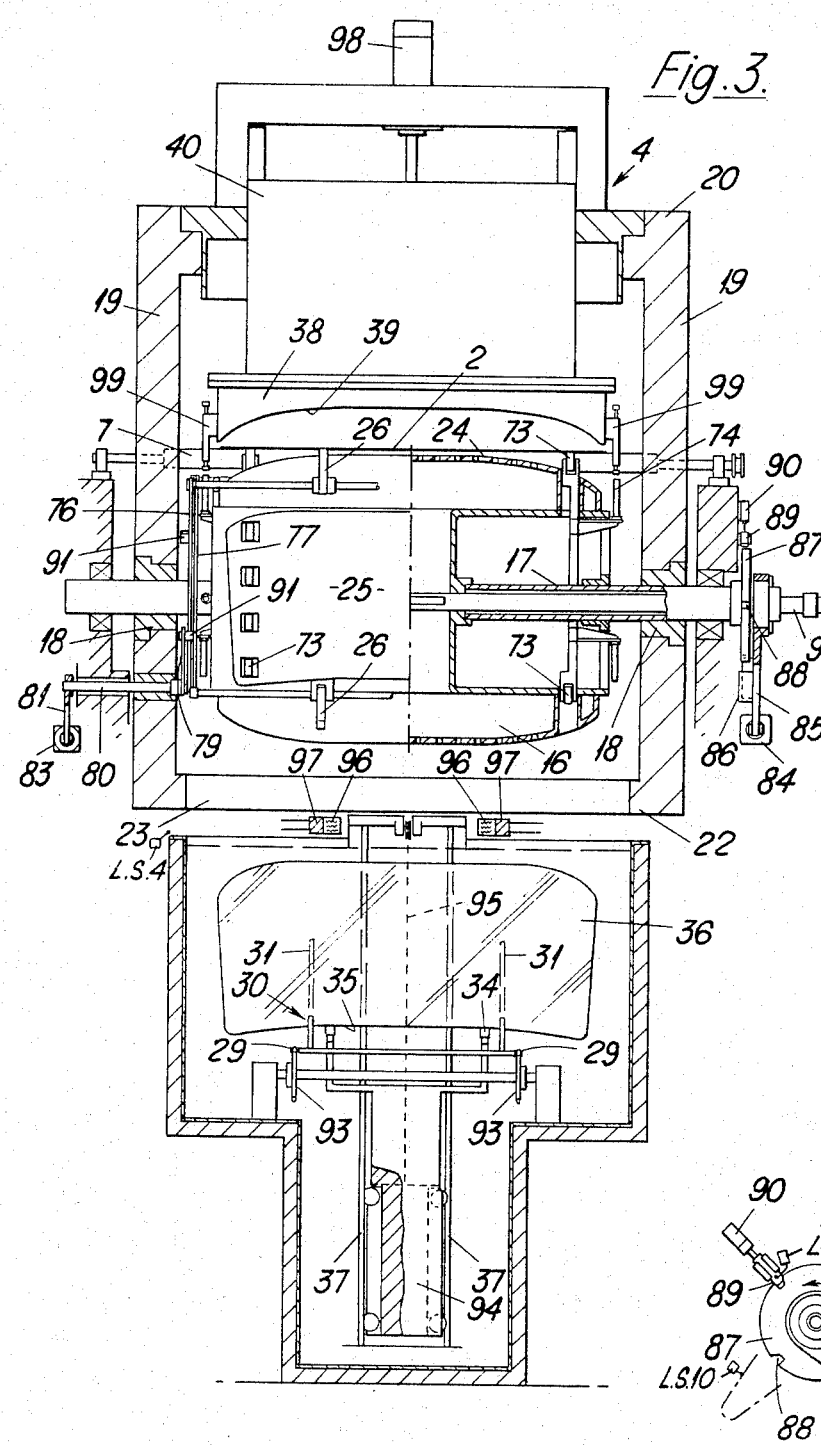

3,782,916
Patented Jan. 1, 1974

3,782,916
PRODUCTION OF TOUGHENED AND
BENT GLASS SHEETS
John Ernest Powell, Hopwood, Birmingham, and Peter
Henry Richards, Kenilworth, England, assignors to
Triplex Safety Glass Company Limited, London, England
Filed Sept. 11, 1972, Ser. No. 288,178
Claims priority, application Great Britain, Sept. 13, 1971,
42,561/71
Int. Cl. C03b 27/00
U.S. Cl. 65—104                                    19 Claims

ABSTRACT OF THE DISCLOSURE

A toughened glass sheet is produced by a method in which the glass is advanced in a horizontal disposition and is heated as it is advanced on to a horizontal support surface on which the hot sheet is held. The support surface is rotated to a vertical disposition and the sheet is then released from that surface and lowered into a chilling liquid. The support surface may be the surface of a bending die on which the sheet is bent prior to toughening by quenching in the chilling liquid.

BACKGROUND OF THE INVENTION

(1) Field of the invention

This invention relates to toughening glass sheets.
More especially, the invention provides an improved method and apparatus for the production of bent and toughened sheets of glass, and provides a continuous process for the production of bent sheets of glass, e.g. automobile windscreens, which have been toughened by quenching the hot bent sheet immediately after bending in a chilling liquid, for example an oil.

(2) Description of the prior art

In a liquid toughening process which is currently in use the stages of the process are carried out in a vertically disposed apparatus which has a heating furnace at the top of the apparatus with a pair of corresponding bending dies in line with and below the outlet for glass sheets from the bottom of the furnace and a tank of chilling liquid beneath the bending dies. Each sheet of glass is loaded on to tongs and then hauled upwardly between the open bending dies to carry the glass sheet into the furnace where it is held until it has reached a temperature near to its softening point. The hot sheet is then lowered to a position between the bending dies which close and bend the sheet and then open to permit the curved sheet to be lowered at a controlled rate into the bath of chilling liquid where it is quenched to toughen the glass.

In this apparatus only one sheet of glass can be processed at a time.

It is a main object of the present invention to provide an improved method and apparatus for toughening or bending and toughening glass sheets in a manner which can be operated continuously with glass sheets fed in succession into the apparatus, the sheets being eventually quenched by immersion in a bath of chilling liquid.

SUMMARY

A toughened glass sheet is produced by advancing a glass sheet along a path with one of the major surfaces of the sheet uppermost, and heating the sheet to toughening temperature during its advance onto a horizontal support surface. The hot sheet is held in contact with the support surface, and the support surface is rotated to a vertical disposition with the glass sheet maintained in contact therewith. Thereafter the sheet is released from the support surface and lowered at a controlled rate into a chilling liquid which toughens the glass sheet.

The support surface may be a surface of horizontally disposed bending dies which close to bend the sheet before the die supporting the glass is rotated to a vertical disposition with the bent glass sheet maintained in contact therewith.

BRIEF DESCRIPTION OF THE DRAWINGS

FIG. 1 is a perspective view, partly cut away, of a bending and toughening apparatus according to the invention, FIG. 2 is an axial section of the bending and toughening stations of the apparatus shown in FIG. 1, FIG. 3 is an end view, partly cut-away and partly in section, of the bending and toughening stations of the apparatus shown in FIG. 1, FIG. 4 is a detailed view of the indexing mechanism for the rotatable die member of the apparatus shown in FIG. 1.

DESCRIPTION OF THE PREFERRED EMBODIMENTS

Figure 5:
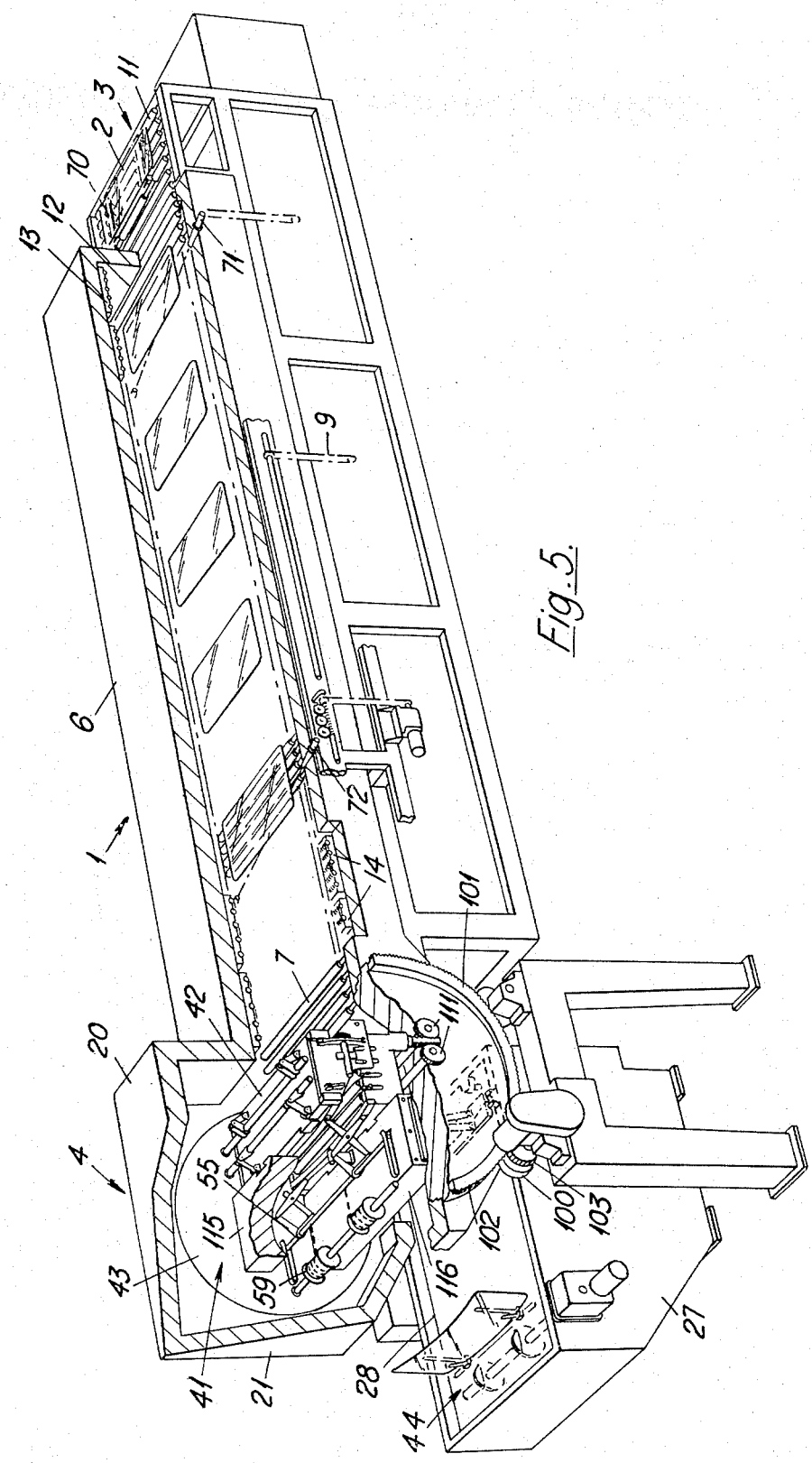
FIG. 5 is a perspective view similar to FIG. 1 illustrating a second embodiment of the invention.

Referring to FIGS. 1 to 4, there is shown a horizontal furnace generally indicated at 1 through which flat sheets of glass 2 are conveyed in succession from a loading station 3 to a bending station 4.

The walls 5 and the roof 6 of the horizontal furnace 1 are shown cut away to reveal a horizontal conveyor comprising rollers 7 which are mounted on axles 8 which pass through the walls 5 of the furnace, and are driven in conventional manner by chain drives 9 mounted outside the furnace walls 5 and protected by covers 10. Radiant heating elements 13 are mounted in the furnace roof 6 along the entire length of the roof 6 and there are also bottom heating elements 14 disposed beneath the rollers 7. The bottom heating elements 14 are so located relative to the rollers 7 as to avoid, as far as possible, any shadowing of the radiant heat from the elements 14 by the rollers 7.

Conveyor rollers 11 at the inlet end of the furnace 1 are positioned in front of the mouth 12 of the furnace which is of just sufficient height to permit passage of the glass sheets 2 on the rollers 11 which extend from the loading station into the furnace. An operator at the loading station 3 places glass sheets 2 in a rack including two spaced apart bars 70 which extend longitudinally of the conveyor and which are hydraulically operable to lower the glass sheets one by one onto the rollers 11 so that they are carried at a controlled rate into the furnace.

The glass sheets 2 are lowered by the rack onto the rollers 11 in a timed sequence determined by a photo-electric device 71 which signals the passage of the preceding glass sheet into the furnace. During their advance in succession along the rollers 7, the flat glass sheets are gradually heated to their required bending temperature. This results in the glass sheets rising to a temperature of about 600° C. by the time the glass sheets reach the position shown by the sheet 15. During the final part of their advance along the conveyor towards the bending station 4, the glass sheets are passed through a zone in which the temperature is maintained substantially uniform at about 650° C. so that each glass sheet reaches its bending temperature of 650° C. during the final stage of its advance. During its advance through the final heating zone the glass sheet is accelerated so that damage to the under face of the glass sheet by the rollers 7 is minimized. When the glass sheet reaches the end of the final zone and immediately before entry into the bending station 4, temperature equalization within the glass sheet will have occurred. This acceleration of each glass sheet is initiated by a photoelectric device 72 which senses the presence of each sheet when it has entered the final heating zone and controls the respective drive 9 to the rollers 7 of this zone.

At the bending station 4 there is a rotatable member 16 which, in this embodiment, is generally of square cross-section and is made of refractory material. The rotatable member 16 is fixed to a massive shaft 17 which is mounted in bearings 18, the bearings 18 being held in extensions 19 of the side walls 5 of the furnace at the bending station. This extension of the furnace has a roof 20 which is higher than the main roof 6 of the furnace 1, and end wall 21 and a floor 22 in which there is a slot-shaped mouth 23 positioned beneath the vertically disposed face of the member 16 which is nearest to the end wall 21.

To each of the four faces of the member 16 there is fixed a convex bending die surface, two of which are shown at 24 and 25. Thus the rotatable member 16 can be considered as having four peripheral faces each constituting a bending die surface, and these surfaces are brought in succession into the horizontal position of the face 24 which is located immediately opposite the end of the conveyer formed by the rollers 7.

The means for rotating the member 16 is a piston and cylinder 84 attached to a lever 85 freely carried on the shaft 17, and a pawl device 86 attached to the lever 85 and engageable with one of the peripheral notches 88 of a disc 87 fixed on the shaft 17. Thereby pivotal movement of the lever 85 (in an anticlockwise direction as shown in FIG. 4) by the piston and cylinder 84 will effect rotation of the disc 87 and hence the shaft 17. The disc 87 has four peripheral notches 88 spaced apart by 90°. The rotatable member will thereby be indexed through 90° on each stroke of the piston. To retain the rotatable member in its new position, a retractable pawl 89 is entered into one of the notches displaced from the driving pawl device 86, by a piston and cylinder 90.

Projecting from the surface of each of the die members on the rotatable member 16 are four pairs of supplemental disc rollers 73 which are retractable below the surface of the die surface 24, but are initially extended above the surface when the die surface 24 is in the upper horizontal position in order to assist movement of the hot glass sheet which is at bending temperature as it slides over the die surface 24. Each set of four aligned rollers 73 is mounted for retraction below the die surface during the bending operation. For this purpose (see FIG. 3), the rollers 73 of each set are attached to a peg 74 which, during the bending operation, is pressed downwards against biasing means (not shown) thereby retracting the respective rollers 73. This inward movement of the rollers 73, relative to the die surface 24 also effects equivalent outward movement of the rollers 73 associated with the opposite die surface, which at the time is the undersurface of the rotatable member 16.

The forward movement of the glass sheet over the die surface 24 is arrested by a pair of stops 26 provided along the far edge of the die surface, and between the stops there is disposed an air switch 75 to signal that the glass sheet is in position, which switch 75 initiates the bending operation. As shown in FIG. 2 the stops 26 associated with the die surface 24 are operative, but the stops associated with the die surface 25 are inoperative. The mechanism to rotate the stops 26 to their inoperative position comprises at each end of the rotatable member 16, a pair of crossed links 76, 77 respectively attached at each end to the pairs of stops at diagonally opposite corners of the rotatable member, each link having a longitudinal slot 78 through which passes the shaft 17 on which the rotatable member 16 is mounted whereby the link may rotate about the axis of the shaft 17 with the rotatable member and move radially relative to the shaft. Each link 76, 77 also has two pegs 91 adjacent its ends engageable with a lever 79 rigidly mounted on a shaft 80 extending parallel to the shaft 17. The shaft 80 also carries another lever 81 attached to a hydraulically operable piston 82 and cylinder 83. Considering, by way of example, the lever 76 (as shown in FIG. 2), as this lever 76 is rotated by the shaft 17, the piston 82 is retracted thereby pivoting the lever 79 downwardly. The stops 26 will thereby remain operative throughout the rotation of the lever 76 to its new position, i.e. the approximate position of the lever 77 in FIG. 2. To release the stops 26, the cylinder 83 is then operated to extend the piston 82 which will raise the lever 79 to push the respective peg 91 and hence the lever 76 radially of the shaft 17, the lever 76 then taking up the position of lever 77 in FIG. 2.

The surface of each die 24 is formed with a plurality of holes by means of which suction can be applied between the die surface and a sheet of glass located on the surface, so that the glass sheet, when bent, is maintained against the surface of the die. The connection of a vacuum pump (not shown) is made by means of a pipe 92 (see FIG. 3) passing axially through the massive shaft 17. This pipe 92 may also have an alternative connection to a supply of hot air under pressure for a purpose which will be described hereinafter.

Located beneath the extension of the furnace at the bending station 4 is a tank 27 filled with a chilling liquid 28, for example a mineral oil maintained at a temperature in the range 200° C. to 300° C. Almost completely submerged beneath the surface of the chilling liquid is an endless conveyor comprising a pair of belts 29, and a series of racks 30 (only some of which are shown) which are attached at either end to the belts 29 with upright support rods 31 having nests 32 in which the lower edge of a bent sheet of glass 36 can engage. The belts 29 are driven around two pairs of spaced apart pulley wheels 93, and the racks 30 can rotate around these pulley wheels passing through a deeper central extension 33 of the tank 27.

Also mounted in the tank 27 and submerged in the liquid 28 are lowering means for providing support to the lower edge of a bent sheet of glass 36 as it leaves the die surface 25 of the rotatable member 16. The lowering means comprises a pair of spaced apart support blocks 34 for engaging the lower edge 35 of the bent glass sheet 36 which blocks are mounted on an upright carriage 94 movable up and down upright tracks 37 by a chain 95. As the carriage 94 and hence the support blocks 34 are lowered down the tracks 37, so the hot bent glass sheet 36 is lowered at a controlled rate into the chilling liquid 28 in order to quench and thereby toughen the glass. The sheet of glass 36 when completely submerged in the chilling liquid 28 is lifted from the support blocks 34 by one of the racks 30 on the conveyor, which then moves the bent glass sheet on an inclined plane upwardly through the liquid and out through the surface of the liquid to an unloading station near the extension 33 of the tank 27. The residence time of the glass sheet in the chilling liquid is sufficient to allow the glass to have been cooled to near the temperature of the chilling liquid before the glass sheet is completely removed from the tank.

Mounted between the tank of chilling liquid 28 and the mouth 23 in the floor 22 of the bending station 4, are means 96 for reheating the support blocks 34 each time they are raised from the liquid 28 to engage the lower edge 35 of a further bent glass sheet 36. This heating of the support blocks is necessary to avoid thermal shock to the glass. The heating means 96 comprise electric heaters mounted in U-shaped frames 97 which are slidable between their operative position (see FIG. 3) and an inoperative position lying outside the downward path of the bent glass sheet 36.

At the bending station 4 the upper concave die 38 has a surface 39 complementary to the surface of each of the lower convex dies which are fixed to the rotatable member 16. Normally the upper die 38 is retracted well above the member 16 so as to permit free rotation of the member 16 carrying a sheet of glass. The upper die 38 is carried on a mounting block 40, which is movable towards and away from the rotatable member 16 by a piston and cylinder unit 98 mounted above the roof 20 of the furnace extension at the bending station 4. Attached to the upper die 38 are vertical pushers 99 engageable with the pegs 74 to press the pegs downwardly and hence retract the glass sheet support rollers 73 below the die surface 24 of the rotatable member 16.

Furthermore, the apparatus includes the following limit switches, in addition to the above described air switch 75 and photo-electric devices 71, 72:

LS1.—On completion of the downward movement of the upper die 38, i.e. when the dies are closed, LS1 energizes the cylinder 98 to raise the upper die 38, there being incorporated a preset time delay to allow the glass sheet 2 to take up the curvature of the dies.

LS2.—On completion of the upward movement of the upper die 38, LS2 energizes the cylinder 84 which indexes the rotatable member 16 through 90°. LS2 also initiates raising of the carriage 94 and hence the support blocks 34 into the reheating means 96.

LS3.—On completion of the indexing lever 85 and hence the rotary movement of the member 16, LS3 energized the indexing locking cylinder 94 to engage the pawl 89 wiht the respective notch 88 in the disc 87. LS3 also causes the reheating frames 97 to be moved out of the subsequent downward path of the curved glass sheet 36. LS3 further initiates the return stroke of the cylinder 84 to reset the indexing lever 85.

LS4.—On retraction of the reheating frames 97, LS4 effects further upward movement of the support blocks 34 to engage the lower edge 35 of the bent sheet 36.

LS5.—LS5 then energizes the cylinder 83 to withdraw the respective stops 26 beneath the bent sheet 36, and also releases the vacuum retaining the sheet against the die surface 25.

LS6.—On completion of the stroke of the cylinder 83, LS6 causes the carriage 94 to be lowered down the tracks 37 and thereby the sheet 36 to be lowered at a controlled rate into the chilling liquid 28. LS6 also resets the locating stop lever 79 in its lower position.

LS7.—This switch effects retention of the support blocks 34 in the reheat means 96.

LS8.—This switch stops the conveyor belts 29 to position each rack 30 in position to receive the succeeding bent sheet 36.

LS9.—This switch energizes the conveyor belts 29 to index each sheet 36 away from the support blocks 34.

LS10.—This switch signals the index lever 85 to be reset.

LS11.—When the pawl 89 is engaged within its notch 88, LS11 initiates the return stroke of the cylinder 84.

LS12.—At 30° of rotation of the rotating member LS12 switches on the vacuum to retain the bent sheet against the lower die surface.

In operation of the apparatus shown in FIGS. 1 to 4, each flat glass sheet 2 is fed one by one onto the rollers 11 and into the furnace 1, the spacing between the sheets being determined by the photo-electric device 71 and in synchronism with the frequency of the subsequent bending operation. The glass sheet 2 then progresses along the rollers 7 of the furnace until it is heated to its bending temperature, e.g. 650° C., and is then accelerated through the final heating stage onto the lower bending die surface 24, the initial rate of feed of glass sheets having been such that it ensures presentation of each glass sheet to the respective lower die surface only when said surface is horizontal and ready to receive it. The sheet is arrested by the raised stops 26. The hot sheet 2 lies temporarily resting on the rollers 73. Immediately the air switch 75 is actuated by contact between the hot glass sheet and the stops 26, the rollers 73 are retracted into the rotatable member 16 so that the glass sheet rests on the die surface 24. At the same time the upper die 38 descends and the glass sheet is bent between the surface 39 of the upper die 38 and the surface 24 of the rotatable member 16. After a fixed time delay which is sufficient for the glass sheet to be pressed into conformity with the shape of the die surface 24, LS1 energizes the cylinder 98 and the upper die is retracted. LS2 then energizes the cylinder 84 to rotate the massive shaft 17 and hence the member 16 is rotated through 90° in an anticlockwise direction as shown in FIG. 1. The die surface 24 is thereby moved into the vertical position as indicated by the die surface 25. As the rotatable member 16 reaches the 30° position a port is exposed at the center of the rotatable member 16, so that suction is applied to the die surface 24 through the holes in the die surface in order to maintain the bent glass sheet 36 in contact with the lower die surface.

While the bent glass sheet is being carried by the rotation of the die surface 24 into a vertical disposition, the support blocks 34 have been raised from the bath of chilling liquid, reheated by the heating means 96 to the temperature of the hot glass sheet 36 and then further raised to engage the lower edge of the glass sheet. At the same time LS5 energizes the cylinder 93 which retracts the stops 26. LS5 also releases the suction on the glass sheet by covering the port at the center of the rotatable member 16, and to assist separation of the bent glass sheet from the die surface hot air is blown through the holes. Immediately the glass sheet has been released LS6 actuates the downward movement of the carriage 94 and the support blocks 34 in order to lower the hot bent glass sheet at a controlled rate into the chilling liquid 28.

The chilling action takes place very rapidly and on arrival of the support blocks 34 at their lower position LS9 actuates movement of the racks 30 forward one position, and thereby transfers the bent and toughened glass sheet from the support blocks 34 to one of the racks 30. Thereafter the glass sheet cools during its further movement on the conveyor out of the tank 27 to bring the bent and toughened glass sheet to the location 44 where it is unloaded for subsequent degreasing and washing. The glass sheet would normally be allowed to cool to room temperature after removal from the conveyor rack 30, and is then washed in a mixture of water and detergent.

Figure 7:
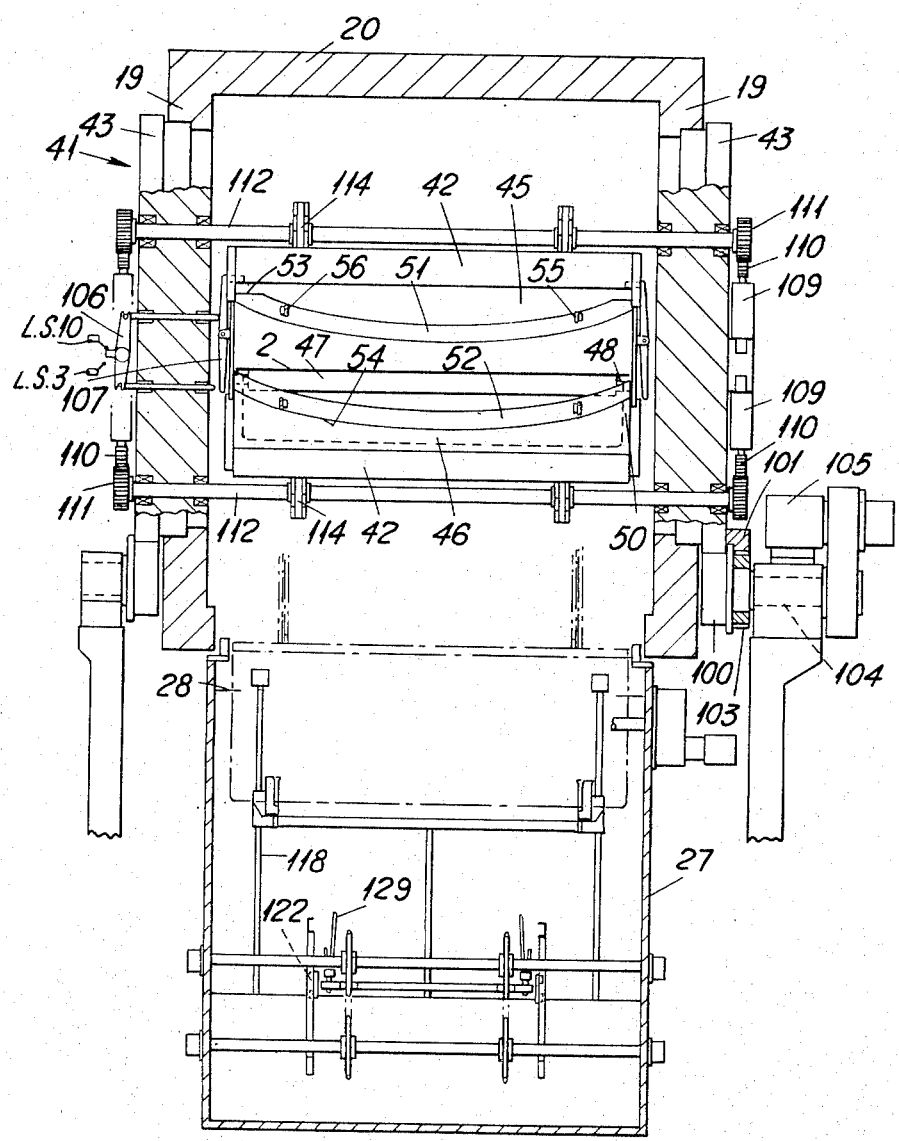
FIG. 7 is a composite transverse section through the bending and toughening stations of the apparatus shown in FIG. 5.

In the embodiment illustrated in FIG. 5 the horizontal furnace extending from the loading station 3 to the bending station 4 is the same as that described for the embodiment of FIG. 1, and the same reference numerals have been employed. At the bending station 4 there is again an extension of the furnace with a roof 20, end wall 21 and floor 22. In this embodiment the furnace extension houses a rotatable unit 41 containing a pair of upper and lower bending dies 45, 46 respectively. The unit comprises an outer frame structure 42 of rectangular shape which is fixed at its lateral ends to circular end pieces 43 which are mounted in bearings in the side walls 19 of the furnace extension. Each of the circular end pieces 43 is supported on a pair of rollers 100 externally of the side walls 19, and on its outer surface has an arcuate segment 101 having teeth 102 along its outer peripheral edge. The teeth 102 of each segment 101 engage in corresponding teeth of a gear wheel 103 mounted on the output shaft 104 of a drive unit 105 whereby the unit as a whole may be rotated through 90°. Mounted within the rectangular frame 42 are upper and lower bending dies respectively 45 and 46. The upper die 45 is a solid member and the lower die 46 is a frame die in which there are mounted four rollers 47 having stub axles 48 mounted in slots 49 contained in the side walls 50 of the lower die 46. The rollers 47 are movable up and down relative to the slots 49 by levers 106 (one of them is shown in FIG. 7) acting through one of the circular end pieces 43 on levers 107 within the unit 41 and having their lower ends connected to the stub axles 48 of the rollers 47. Cylinders are provided to lock the rollers in their lowered position before rotation of the unit 41. When in the initial position with the dies open and the frame structure 42 disposed horizontally (as shown), the rollers 47 are raised to their upper position in which they are on a level with the rollers 7 of the furnace conveyor so that a hot flat sheet of glass 2 can be slid between the dies onto the rollers 47. Immediately the glass sheet is located in position by stops 108, the rollers 47 are lowered by the lever mechanism controlled by the levers 106 so that the hot sheet of glass 2 rests on the lower frame die 46. The lever mechanism is actuated by an air switch LS1 located between the stops 108.

Figure 6:
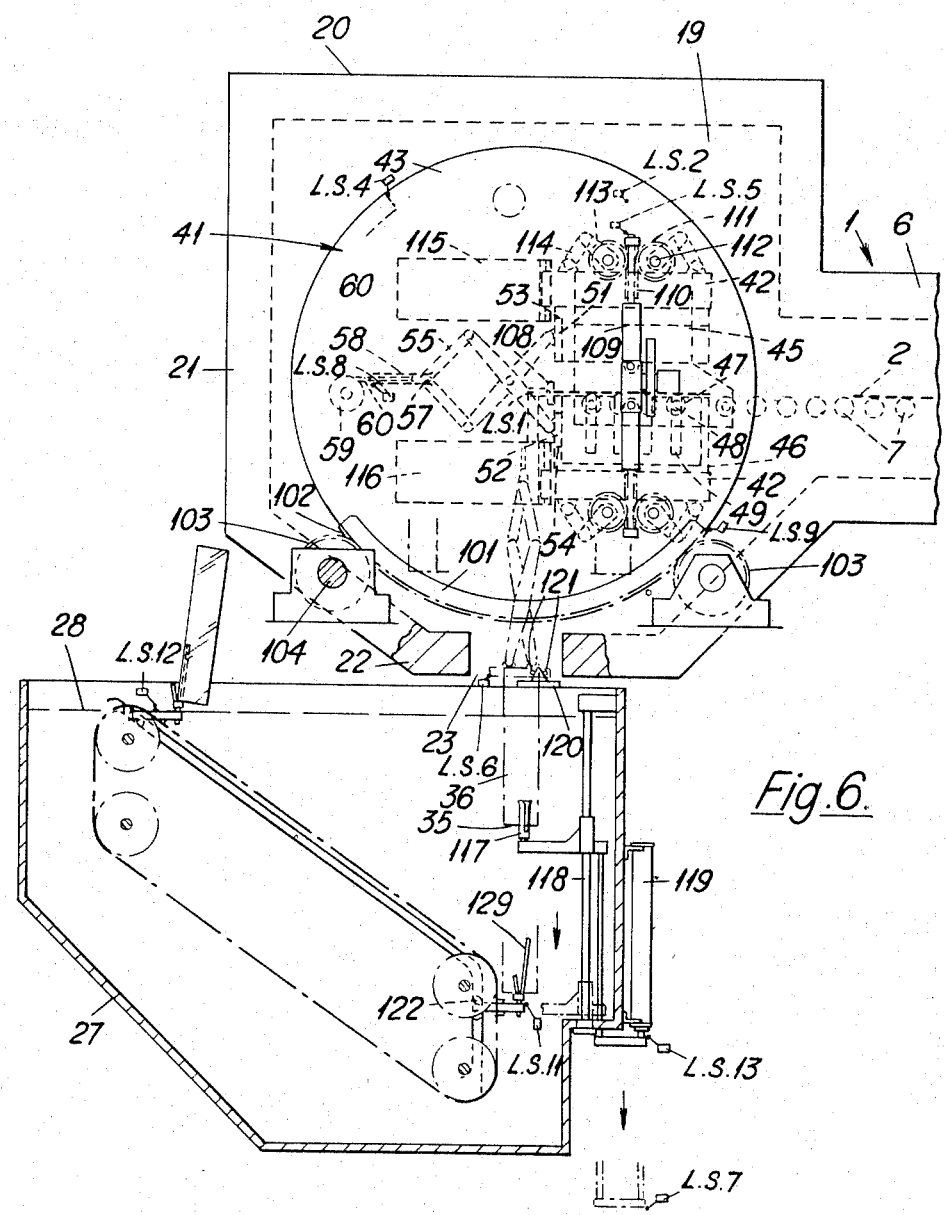
FIG. 6 is an axial section of the bending and toughening stations of the apparatus shown in FIG. 5.

Shaped tong bars 51 and 52 extending transversely of the direction of movement of the sheet 2 are fitted into recesses 53 and 54 in the edges of the dies which are uppermost when the unit 41 is swung downwardly to a vertically disposed position (see FIG. 6). The tong bars 51 and 52 are pivotally fixed adjacent their ends to a scissors linkage 55 and 56 which is in the retracted position when the dies 45 and 46 are in the horizontal. The other end of each linkage is mounted on a cross-bar 57 which is connected to a hoist 59 for sliding the bar 57 in forks 58 which are fixed to the inner surface of the respective circular end pieces 43. The length of each tong bar 51, 52 extends over the full width of the bending dies and thus subsequently along the full length of the curved sheet. This is most beneficial to maintain the curvature of the sheet prior to toughening in the chilling liquid.

Mounted externally of each of the circular end pieces 43 are a pair of vertical pistons and cylinders 109 acting in opposite directions. The piston of each cylinder 109 has a rack portion 110 engaging with a pair of gear wheels 111 mounted on shafts 112 passing through the end pieces 43 and connected by levers 113, 114 to the dies 45, 46. Extension of the piston of each cylinder 109 will cause rotation of the wheels 111 and hence closure of the dies 45, 46 to bend a glass sheet 2 disposed therebetween.

On completion of the bending operation, the unit 41 is ready to be rotated by the drive unit 105 in a clockwise direction as shown in FIGS. 5 and 6 until the dies are disposed in a vertical position. Counterweights 115, 116 are provided to balance the dies 45, 46 during rotation of the unit 41, the counterweights being fixed between the circular end piecs 43 and connected by dovetail joints to the frame structure 42.

As before, the floor 22 of the furnace extension has a mouth 23 through which the hoist may lower the bent glass sheet 36 whilst gripped by the tong bars 51, 52 at a controlled rate into a tank 27 of chilling liquid 28. Mounted within the tank 27 beneath the mouth 23 is a cradle 117 which engages the lower edge 35 of the sheet 36 and which is driven up and down vertical guide rods 118 by a cylinder 119. On either side of the tank 27 at a level just above the chilling liquid level is a wedge 120 which is engaged by pegs 121 protruding from the ends of the tong bars 51, 52 and causes the tong bars to more laterally to release the sheet 36 when the major portion of the sheet is immersed in the chilling liquid. Further downward movement of the sheet 36 resting in the cradle is then effected until the sheet is transferred into one of a series of racks 129 pivotally mounted between a pair of conveyor chains 122. These chains act in the same manner as the conveyor belts of the first embodiment to carry each curved and toughened glass sheet in turn along an upward inclined path to an unloading station 44.

The following limit switches are provided for controlling the continuous operation of the apparatus of this embodiment:

LS1.—This switch LS1 is an air switch which signals that a glass sheet 2 is in position between the dies 45, 46. LS1 also operates the lever mechanism to lower the rollers 47 and energizes the cylinders 109 to close the dies 45, 46.

LS2.—On closure of the dies 45, 46, LS2 energizes the main drive unit 105 to rotate the unit 41 through 90°, and also energizes the cylinders to lock the rollers 47 in their lowered position.
dies are vertical and the rollers .4s LS3 and LS4.—An integrated signal from these switches when the dies are vertical and the rollers 47 are locked, energizes the cylinders 109 to open the dies 45, 46.

LS5.—When the dies are opened, LS5 energizes the hoist 59 to lower the curved sheet 36 supported by the cradle 117 into the chilling liquid 28 until the wedges 120 open the tong bars 51, 52.

LS6.—On release of the curved sheet 36 from the tong bars 51, 52, LS6 energizes cylinder 119 to fully immerse the curved sheet.

LS7 and LS11.—On completion of the stroke of the cylinder 119, an interlocked signal from LS7 and LS11 actuates the conveyor chains 122 to index the racks 129 towards the unloading station 44.

LS8.—When the hoist has been raised, LS8 energizes the cylinders 109 to close the dies.

LS9 and LS10.—An interlocked signal from these switches indicates that the dies have been returned to their horizontal position and the support rollers 47 are raised for support of a further flat glass sheet 2. LS9 and LS10 then open the dies.

LS12.—When the conveyor has indexed the sheet 36, LS12 energizes the cylinder 119 to raise the cradle 117.

LS13.—This switch is reset on completion of the upward stroke of the cylinder 119.

In operation of this embodiment, a hot glass sheet 2 is fed between the bending dies 45, 46 from the rollers 7 and is supported therebetween by the rollers 47. When the sheet is positioned, LS1 causes the rollers 47 to be lowered and the dies to close. At the same time the bar 57 is drawn backwardly by the hoist 59 into the forks 58 so that the scissors linkage 55 and 56 are closed to cause the shaped tong bars 51 and 52 to grip the curved sheet along its entire length. With the dies 45, 46 closed and the tong bars 51, 52 gripping the sheet, the drive unit 105 is operated to swing the unit 41 about the axis of the cylindrical end pieces from its horizontal position shown, to its vertical position in which the closed dies are located with the very bottom edges above the mouth 23 in the furnace extension 20. The die actuating means then operate to open the dies, but the top edge of the sheet is retained gripped in the tong bars 51 and 52 as indicated by the chain dotted lines. The dies 45 and 46 are retracted to the positions shown by chain dotted lines and the hoist 59 which is attached to the bar 57 by chains 60 is operated to lower the bar 57 out of the forks 58, and thereafter to continue lowering the sheet at a controlled rate a part way into the tank 27 of quenching liquid 28.

At this time the lower edge of the bent sheet 36 is supported by the cradle 117. The tong bars 51, 52 may be released from the sheet 36. Thereafter, whilst the tong bars 51, 52, dies 45, 46, rollers 47 and unit 41 are returned to their initial position for reception of a further sheet 2 from the furnace, the preceding sheet 36 is fully immersed into the chilling liquid, transferred onto a rack 129 and indexed towards the unloading station 44.

Figure 8:
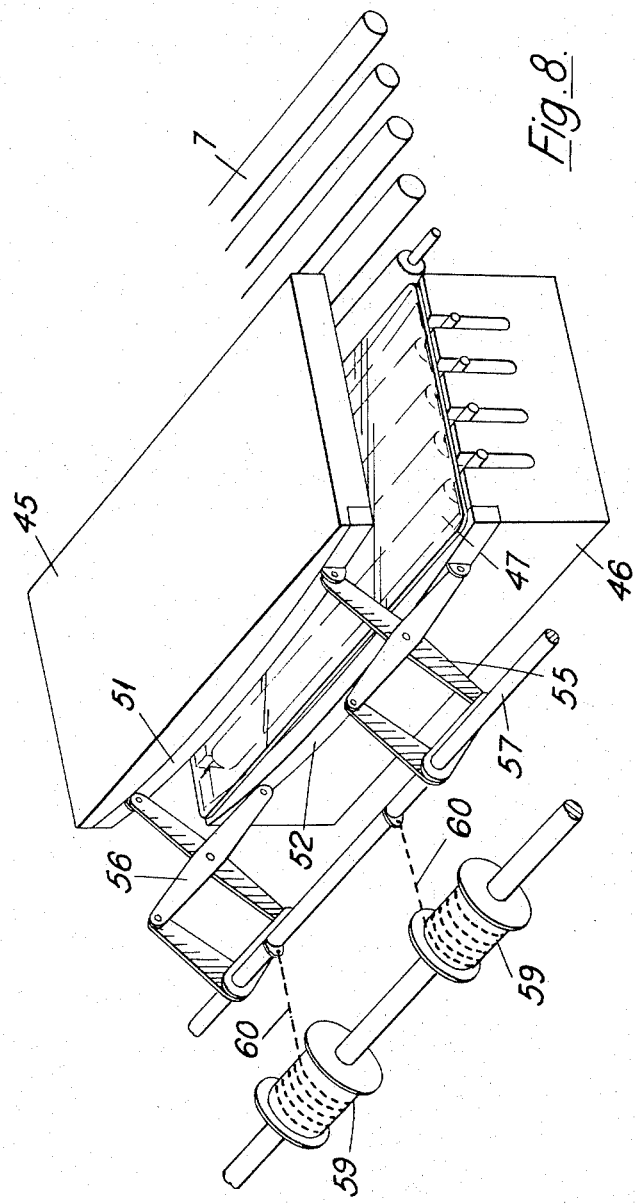
FIG. 8 is a diagrammatic perspective view of a modified form of the apparatus of FIGS. 5 to 7 showing the bending dies in a horizontal bending position.
Figure 9:
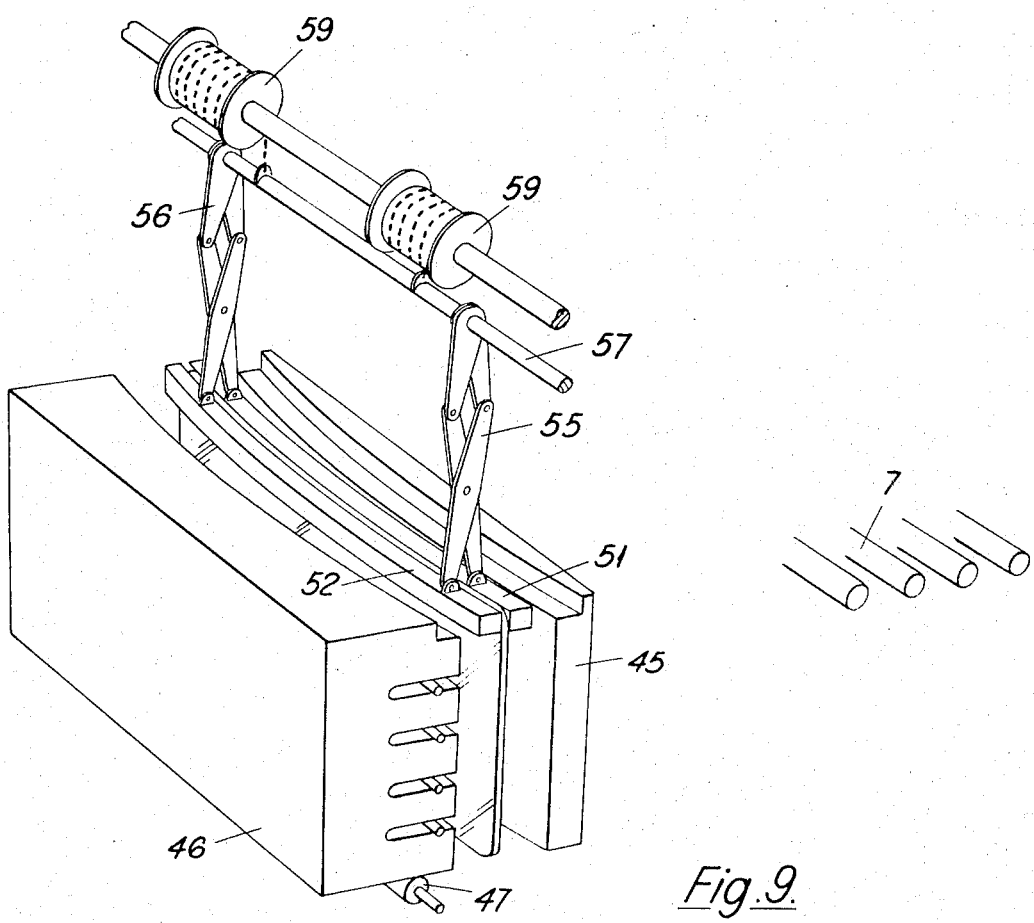
FIG. 9 is a view of the apparatus of FIG. 8 showing the bending dies in a vertical position just after the dies have been opened.

FIGS. 8 and 9 illustrate a slightly modified version of the apparatus shown in FIGS. 5 to 7, in which the rollers 47 within the lower die are not lowered but rather the lower die member 46 is raised in order to lift the hot glass sheet from the rollers and to press it against the upper die member. The upper die 45 is lowered to meet the lower die member 46 at a level which is higher than the level of the conveyor formed by the rollers 7. Immediately thereafter the unit 41 containing the closed dies is swung down to the vertical position shown in FIG. 9. The dies are retracted as shown, and the glass sheet is lowered by the hoist 59 into the chilling liquid as in the previous embodiment.

In each embodiment, other thermal treatments of the bent glass sheet 36 may be carried out as it descends from between the bending dies, and before it enters the chilling liquid. For example, the sheet may be given a preliminary quench using air or using a liquid spray.

If desired the rotatable member 16 of the embodiment shown in FIGS. 1 to 4 may be replaced by a member having only one lower die surface 24 which is reciprocable by the indexing lever 85 between the horizontal position and the vertical position.

The apparatus of each embodiment, when modified, may be employed for toughening flat glass sheets. In the embodiment of FIGS. 1 to 4, the necessary modification involves the replacement of the four convex surfaces of the rotatable member 16 by flat surfaces and the removal, or rendering inoperative, of the upper concave die 38. With these modifications, each flat glass sheet is heated in the furnace to toughening temperature, advanced onto the uppermost support surface of the rotatable member rotated through 90° into a vertical disposition whilst being maintained in contact with the support surface by suction, released from the support surface, and lowered on the support blocks 34 at a controlled rate into the bath of chilling liquid. The sheet is then, as before, transferred onto one of the racks 30 and conveyed to the unloading station.

Regarding the embodiments of FIGS. 5 to 7, FIG. 8 and FIG. 9, the necessary modifications involve replacement of the convex and concave bending surfaces by flat surfaces. These flat surfaces are then operable to receive each sheet in turn when conveyed therebetween from the furnace in which the sheet is heated to toughening temperature, to close onto the heated sheet and then to transfer the sheet from a horizontal disposition into a vertical disposition. Opening of the flat surfaces then allows the sheet to be lowered at a controlled rate into the bath of chilling liquid, whereupon the sheet is toughened.

In another application of the invention flat sheets may be caused to sag to a desired curvature as they are advanced horizontally through the furnace and then held in contact with a support surface of matching curvature which is rotated to carry the sheet to a vertical disposition prior to quenching.

We claim:

1. A method of producing a toughened glass sheet, comprising advancing a glass sheet along a path with one of the major surfaces of the sheet uppermost, heating the sheet to toughening temperature during its advance, advancing the sheet at that temperature, onto a horizontal support surface, holding the hot sheet in contact with the support surface, rotating the support surface to a vertical disposition with the glass sheet maintained in contact therewith, releasing the sheet from the support surface, and lowering the sheet at a controlled rate into a chilling liquid which toughens the glass sheet.

2. A method according to claim 1 of producing a bent and toughened glass sheet comprising heating the sheet to bending temperature during its advance along said path, advancing the sheet at bending temperature to a bending station between horizontally disposed bending dies, closing the dies to bend the sheet, rotating at least one of the dies to a vertical disposition with the bent glass sheet maintained in contact therewith, and then releasing the bent sheet from that die for quenching in the chilling liquid.

3. A method according to claim 2, comprising opening the dies with the bent sheet supported on the lower die prior to rotating the lower die to a vertical disposition with the bent sheet maintained in contact therewith.

4. A method according to claim 3, for continuously producing bent and toughened glass sheets, comprising advancing glass sheets in succession along said path to the bending station where the lower bending die is one of a plurality of lower bending dies which constitute the peripheral faces of a rotatable member, and synchronizing the rotation of that member with the feeding of the sheets to the bending station to ensure presentation of each of the die surfaces in succession into said path just before a hot glass sheet arrives at the bending station.

5. A method according to claim 4, comprising maintaining the bent sheet against the surface of the lower bending die during rotation of that die, by suction applied through a plurality of holes in that surface, and breaking that suction to release the sheet when that surface is vertically disposed.

6. A method according to claim 3, including engaging the lower edge of the vertically disposed bent sheet with a support for the sheet when it is released from the die surface, and lowering the sheet on said support at a controlled rate of descent.

7. A method according to claim 1, including gripping an edge, ultimately the top edge, of the sheet while it is disposed between the dies, swinging the dies downwardly to a vertical disposition, opening the dies by retracting them from the now vertically suspended bent sheet, lowering the bent sheet into the chilling liquid and swinging the dies upwardly back into said path to receive the next hot glass sheet for bending.

8. A method according to claim 7, including gripping said edge of the bent sheet along its whole length thereby constraining that edge to its bent configuration during subsequent quenching.

9. A method according to claim 1, comprising heating a glass sheet to about 650° C. as it is advanced towards said dies, and maintaining the glass at about that temperature during the final stage of its advance just before it moves between the dies, thereby thermally equalizing the sheet prior to bending.

10. Apparatus for toughening a sheet of glass, comprising a conveyor for advancing a sheet of glass along a path with one of its major surfaces uppermost, a furnace for heating the glass during its advance, a horizontal support surface downstream of the furnace, means for locating the hot glass sheet on the support surface, means for holding the sheet in contact with the support surface, means for rotating the support surface to a vertical disposition with the glass sheet maintained in contact therewith, means for releasing the sheet from the support surface, and means for lowering the sheet at a controlled rate into a chilling liquid to toughen the glass sheet.

11. Apparatus according to claim 10 for producing a bent and toughened glass sheet, wherein the conveyor is arranged to advance a sheet of glass from a loading station through the furnace to a bending station which includes a pair of horizontally disposed bending dies, means for advancing the hot glass sheet between the dies and locating the sheet therebetween, means for closing the dies to bend the glass, means for rotating at least one of the dies to a vertical disposition with the bent glass sheet maintained in contact therewith, and means for releasing the bent sheet from that die for descent into a chilling liquid.

12. Apparatus according to claim 11, including a bath of chilling liquid positioned beneath the vertical position of the die surface on which the bent glass sheet is held.

13. Apparatus according to claim 12, including means for lowering the sheet from the bending station into the chilling liquid at a controlled rate.

14. Apparatus according to claim 13, wherein the lowering means comprise support means for engaging the lower edge of the bent glass sheet, and upright tracks down which the support means is movable to lower the bent sheet into the chilling liquid.

15. Apparatus according to claim 11, comprising at the bending station a rotatable member mounted on a horizontal axis and having peripheral faces each constituting a lower bending die surface, and means for rotating that member intermittently to present one of said faces into a horizontal position for receiving a glass sheet at the same time as a bent glass sheet is carried on another of said faces into said vertical disposition.

16. Apparatus according to claim 15, wherein the rotatable member is of generally square cross-section and has four peripheral faces each constituting a lower bending die surface.

17. Apparatus according to claim 15, including an upper die member mounted above the rotatable member and depending from means for depressing the upper die member into engagement with a glass sheet on one of said faces of the rotatable member and for retracting the upper die member after bending to a position permitting rotation of the rotatable member.

18. Apparatus according to claim 11, wherein the dies are mounted together as a unit which is rotatable about a horizontal axis and includes means for closing and opening the dies, and driving means is connected to the unit for swinging the unit when the dies are closed, from a horizontal position at the end of the conveyor to a vertical position, and swinging the unit back to the horizontal position after the dies have been opened to release a bent sheet.

19. Apparatus according to claim 18, including shaped tong bars respectively fitted into recesses in the upper edges of the dies to grip one edge of the sheet along its whole length when the dies are closed, actuating means for maintaining the tong bars closed on to the edge of the bent glass sheet when the dies are opened, and a hoist connected to the gripping means and operable to lower the tong bars at a controlled rate.

References Cited
UNITED STATES PATENTS

| | | | |
|---|---|---|---|
| 6,971 | 3/1876 | Royer et al. | 65—116 |
| 2,336,200 | 12/1943 | Von Reis | 65—116 |
| 2,850,844 | 9/1958 | White | 65—273 X |

ARTHUR D. KELLOGG, Primary Examiner

U.S. Cl. X.R.

65—116, 273, 349